United States Patent [19]

Dekker

[11] Patent Number: 4,914,327
[45] Date of Patent: Apr. 3, 1990

[54] CIRCUIT ARRANGEMENT FOR CONTROLLING THE ALTERNATING CURRENT THROUGH A LOAD

[75] Inventor: Jan H. Dekker, Hoogeveen, Netherlands

[73] Assignee: U.S. Philips Corporation, New York, N.Y.

[21] Appl. No.: 265,658

[22] Filed: Nov. 1, 1988

[30] Foreign Application Priority Data

Nov. 5, 1987 [NL] Netherlands .................. 8702645

[51] Int. Cl.$^4$ .................................................. H03K 17/72
[52] U.S. Cl. ..................................... 307/632; 323/324; 323/325
[58] Field of Search ................. 307/632, 643, 645; 323/324, 325

[56] References Cited

U.S. PATENT DOCUMENTS

| | | | |
|---|---|---|---|
| 3,484,623 | 12/1969 | Cain | 307/632 |
| 3,619,656 | 11/1971 | Domke | 307/632 |
| 3,729,651 | 4/1973 | Fricker et al. | 307/632 |
| 3,798,470 | 3/1974 | Burns et al. | 307/632 |
| 4,069,446 | 1/1978 | Yonehara | 307/632 |
| 4,353,025 | 10/1982 | Dobkin | 307/632 |

FOREIGN PATENT DOCUMENTS

7003842 9/1971 Netherlands .

*Primary Examiner*—John Zazworsky
*Attorney, Agent, or Firm*—Bernard Franzblau

[57] ABSTRACT

A circuit for controlling an AC current through a load. The load, e.g. a motor (3), is connected in series with a first triac (7) between two terminals (1, 2) adapted for connection to an AC supply voltage. A series circuit of a capacitor (6) and a parallel circuit consisting of a first (14) and a second (5) resistor is connected parallel to the first triac. The control electrode of the first triac is connected to the capacitor by means of a series circuit of a third resistor (9) and a second triac (10). A control electrode of the second triac is connected to the capacitor by means of a diac (8).

6 Claims, 2 Drawing Sheets

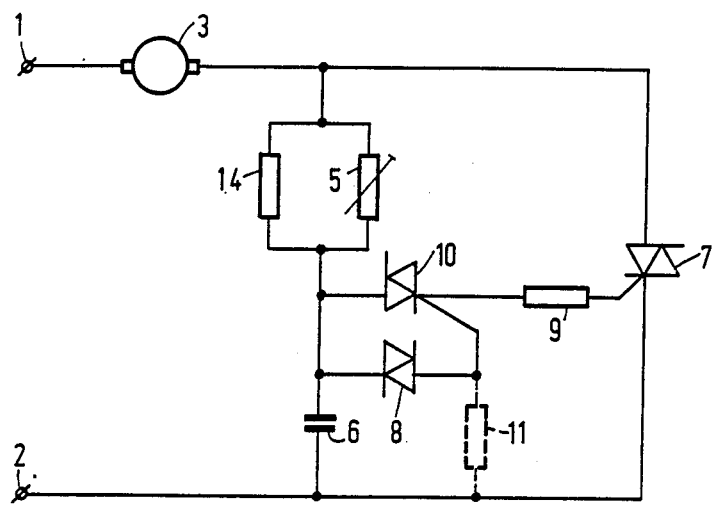
FIG.3
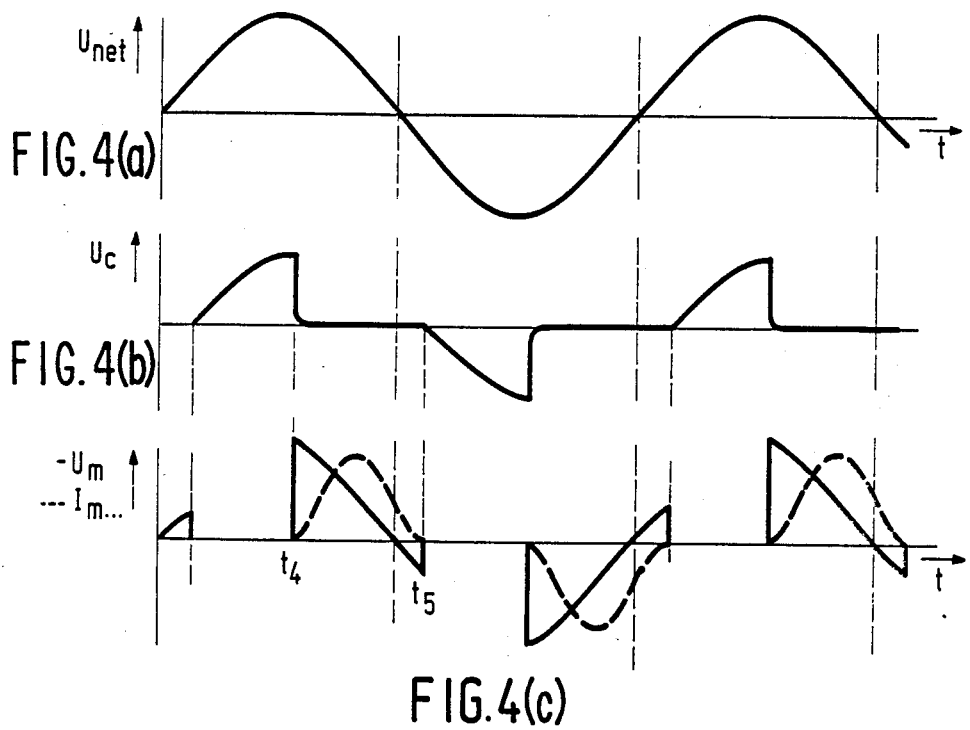
FIG.4(a)
FIG.4(b)
FIG.4(c)

//  4,914,327

CIRCUIT ARRANGEMENT FOR CONTROLLING THE ALTERNATING CURRENT THROUGH A LOAD

BACKGROUND OF THE INVENTION

This invention relates to a circuit arrangement for controlling an alternating current through a load, a terminal of which is connected to a first power supply terminal, said circuit arrangement being connected during operation between the other load terminal and the other power supply terminal and comprising a series circuit of a resistor section and a capacitor section connected between the other load terminal and the other power supply terminal, and a controlled rectifier connected between the other load terminal and the other power supply terminal, the control current for the controlled rectifier being taken via a diac from the junction point between the resistor section and the capacitor section.

A circuit arrangement of this type is known, for example, from Netherlands Patent Application 7003842. If such relatively simple circuit arrangements are used, for example, for controlling a motor or the like, electronic components will generally be used which have a relatively large tolerance in their electrical specification. The result is that at least a control component, for example, a potentiometer is required to control the minimum phase angle of the phase control of the controlled rectifier to the desired value. This control component must be adjusted to the correct value in a control procedure and which is considered to be a serious drawback, particularly in the case of mass production of large numbers of such circuit arrangements.

SUMMARY OF THE INVENTION

It is an object of the invention to provide a circuit arrangement constructed to use control components having relatively large tolerances, but in a manner such that the electric components used do not have a detrimental influence on the operation of the circuit arrangement.

In a circuit arrangement of the type described in the opening paragraph, this object is realized in that a further controlled rectifier is connected between the control terminal of the first-mentioned controlled rectifier and the junction point between the resistor section and the capacitor section, and in that the diac is connected between the last-mentioned junction point and the control terminal of the further controlled rectifier.

BRIEF DESCRIPTION OF THE DRAWING

The invention will now be described in greater detail, by way of example, with reference to the accompanying drawings in which:

FIG. 3 shows a circuit arrangement in conformity with the principle of the invention, and FIGS. 4(a) to 4(c) show voltages and currents occurring in the circuit arrangement of FIG. 3.

DESCRIPTION OF THE PREFERRED EMBODIMENTS

Figure 1:
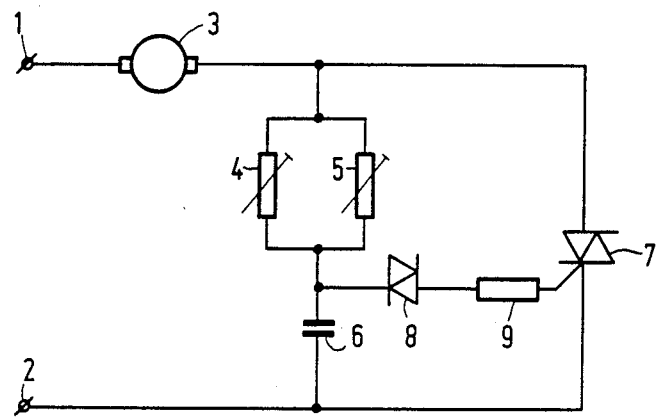
FIG. 1 is a general circuit diagram of a known circuit arrangement with reference to which the drawbacks of this circuit arrangement will be explained.

FIG. 1 shows a generally known circuit arrangement for controlling a load, constructed as a motor in this case. The AC power supply for the motor 3, for example, the mains voltage is presented to the power supply terminals 1 and 2. A terminal of the motor is connected to the mains terminal 1, while the other motor terminal is connected to a controlled rectifier circuit, in this case a triac 7, and is connected to a resistor section comprising a trimming potentiometer 4 and a control potentiometer 5. The two potentiometers 4 and 5 are parallel arranged. A capacitor 6 is connected in series with the parallel arrangement 4, 5 between the other terminal of the motor and the power supply terminal 2. A diac 8, supplying the control current for the control input of the triac 7 via a current limiting resistor 9, is connected to the junction point of the parallel arrangement of the resistors 4 and 5 and the capacitor 6.

Figure 2A:
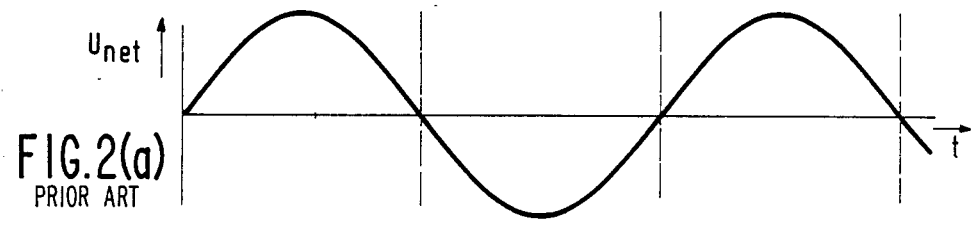
FIGS. 2(a) to 2(c) show some waveforms of voltages and currents occurring in the circuit arrangement of FIG. 1.
Figure 2B:
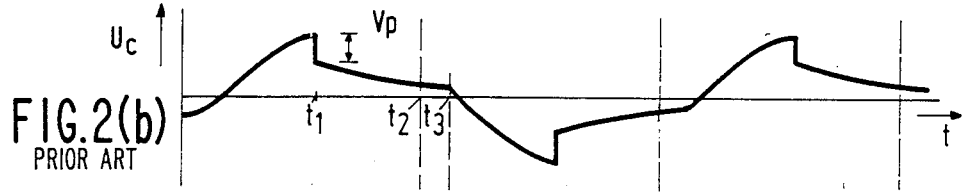
Figure 2C:
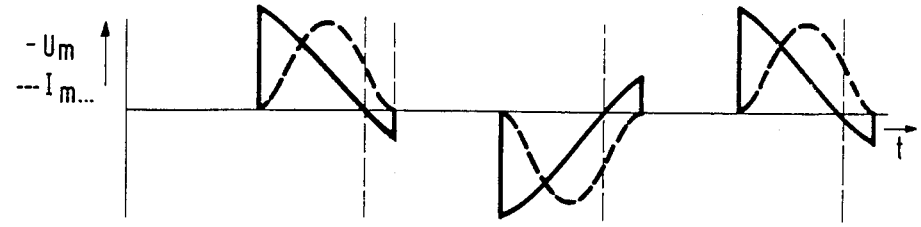

The operation of the circuit arrangement of FIG. 1 will be briefly desribed with reference to FIGS. 2(a) to 2(c) in which a number of current and voltage waveforms of currents and voltages in the circuit arrangement of FIG. 1 have been illustrated. Particularly FIG. 2a shows the waveform of the power supply voltage $U_{net}$ at the terminals 1 and 2. FIG. 2b shows the waveform of the voltage $U_c$ across the capacitor 6. FIG. 2c shows the waveform of the current $I_m$ through the motor and the waveform of the voltage $U_m$ across the motor.

It is apparent from FIGS. 2(a) to 2(c) that during the positive mains voltage period and as long as the triac 7 is not yet conducting, the capacitor 6 will be charged via the parallel arrangement of the resistors 4 and 5 until the breakdown voltage of the diac 8 is reached. The capacitor voltage $U_c$ thus increases gradually. The current through the motor 3 is negligible and also the voltage across the motor 3, which represents only a small impedance as compared with the resistors 4 and 5, is substantially equal to zero.

At the instant when the diac 8 breaks down a voltage drop $V_p$ is produced across this diac, which drop generally has a value varying between 5 and 15 V for the conventional types of diacs. Due to this voltage drop $V_p$ the voltage at the junction point between capacitor 6 and the two resistors 4 and 5 will decrease by $V_p$, which becomes manifest in the waveform of the voltage $U_c$ across the capacitor 6, FIG. 2b. At the instant $t_1$ this capacitor voltage will be reduced stepwise by $V_p$.

At the instant $t_1$ the diac 8 breaks down so that a current starts to flow through the control input of the triac 7 which thereby becomes conductive. The now conductive triac 7 has a substantially negligible resistance with the result that, considered electronically, the capacitor 6 is placed across the parallel arrangement of the resistors 4 and 5 and will now be discharged across these resistors.

The voltage across the capacitor therefore decreases in accordance with an e power: $U_c = U_{t1}(1 - e^{-t/RC})$ wherein: $U_{t1}$ is the voltage across the capacitor at the instant $t_1$, C is the capacitance of capacitor 6, and R is the resistance of the parallel resistors 4 and 5.

At the instant $t_1$ the instantaneous mains voltage will be completely present across the motor 3 due to the triac 7 becoming conductive, as is apparent from FIG. 2c. Consequently, the current $I_m$ will flow through the motor 3 as is also indicated in FIG. 2c. At the instant $t_3$ at which the motor current $I_m$ passes through zero and the triac 7 is thus blocked, the voltage across the capacitor 6 is generally not yet equal to zero. As will be evident from the above, the residual voltage at the instant $t_3$ is dependent on the value of $V_p$, on the capacitance of the capacitor 6 and on the resistances of the resistors 4 and 5. However, this residual voltage constitutes the starting condition for the next charge period of the capacitor and is thus also decisive of the instant at which the triac 7 is rendered conductive again. Since the voltage $V_p$ across the diac 8 can vary within ample limits dependent on the components and since also the tolerance of the control potentiometer 5 in the case of normal components is relatively large ($\pm 12\%$), a considerable spread in the instant at which the triac 7 is rendered conductive will occur in the case of the mass production of such circuit arrangements. Therefore, it is necessary to perform a control by means of the trimming potentiometer 4 in such a way that this spread in the different mass-produced circuit arrangements is at least considerably reduced. However, it is considered to be a drawback to perform such a control procedure. It is true that very accurate components having small tolerances could be used, but this generally has a considerable cost-price increasing effect and thus actually does not provide a solution to the indicated problems.

In conformity with the invention, FIG. 3 shows a modified circuit arrangement which does not require any control. The components which are also present in the circuit arrangement of FIG. 1 have the same reference numerals. In the circuit arrangement of FIG. 3 the ignition current for the triac 7 is not supplied via the diac 8 and the resistor 9, but via a further triac whose control terminal is fed by the diac 8. This triac 10 then controls the control terminal of the triac 7 via the current limiting resistor 9. As will be explained hereinafter, the trimming potentiometer 4 of FIG. 1 is replaced by a fixed resistor 14 in this circuit arrangement.

The operation of the circuit arrangement of FIG. 3 will be described with reference to the diagrams of FIGS. 4(a) to 4(c). FIG. 4a shows the waveform of the power supply voltage $U_{net}$. FIG. 4b shows the waveform of the voltage $U_c$ across the capacitor 6. FIG. 4c shows the waveform of the current $I_m$ through the motor 3 and the voltage $U_m$ across the motor 3.

The capacitor 6 is charged via the parallel resistors 5 and 14 until the breakdown voltage of the diac 8 has been reached at the instant $t_4$. Due to the diac 8 becoming conductive the triac 10 will be rendered conductive and in its turn it supplies the control current for rendering the triac 7 conductive via the resistor 9.

Due to the triac 10 becoming conductive a very low-ohmic discharge path is produced for the capacitor 6, which path extends via the conducting triac 10, the very low-ohmic resistor 9 and the control terminal of the triac 7. Consequently, the capacitor 6 will be discharged very rapidly, as is also apparent from FIG. 4b.

At $t_4$ the instantaneous power supply voltage is applied across the motor 3, and the current $I_m$ through the motor will start flowing in the manner illustrated in FIG. 4c. At the instant $t_5$ at which the motor current crosses zero, the capacitor 6 has been fully discharged. Charging of the capacitor thus always begins from the same initial starting voltage of 0 volt and is thus independent of the value of the voltage $V_p$ across the diac 8 and independent of the value of the resistors in the resistor section.

To prevent the triac 10 from being rendered conductive too early due to interference pulses, it is preferable to arrange a resistor 11 between the control input of the triac 10 and the power supply terminal 2. This resistor is shown in a broken line in FIG. 3.

It will be evident that tolerances in the capacitance of the capacitor 6 and in the resistances of the resistors 5 and 14 still play a role when the capacitor 6 is being charged and thereby influence the instant $t_4$ at which the breakdown voltage of the diac 8 is reached. However, this influence is considerably smaller than in the known circuit arrangement according to FIG. 1 and no longer requires the use of a trimming potentiometer which must be trimmed in a separate procedure.

The circuit arrangement of FIG. 3 has been tested in practice in a 220 V, 50 Hz AC motor with a nominal power of 110 W. When using a capacitor 6 having a tolerance of $\pm 2\%$, a control potentiometer having a tolerance of $\pm 12\%$ and resistors 4 and 11 having a tolerance of $\pm 2\%$, the tolerance of the minimum phase angle was found to be equal to 0.2 msec, which, related to the nominal power of the motor, implies a power control tolerance of $\pm 50$ W. In many applications, for example, in domestic appliances such a tolerance is acceptable without any problem.

Although in the circuit arrangement of FIG. 3 a triac is used for the controlled rectifiers 7 and 10, it is alternatively possible to use the principle of the invention in a circuit arrangement in which thyristors are used as the controlled rectifiers 7 and 10.

Finally, it is to be noted that the resistor 9 does not play an essential role in the operation of the circuit arrangement and may be dispensed with in many cases without any problems.

What is claimed is:

1. A circuit arrangement for controlling an alternating current through a load a terminal of which is connected to a first power supply terminal, said circuit arrangement being connected, during operation, between an other load terminal and a second power supply terminal, said circuit arrangement comprising, a series circuit including a resistor section and a capacitor section connected between the other load terminal and the second power supply terminal, a first controlled rectifier connected between the other load terminal and the second power supply terminal, a further controlled rectifier connected between a control terminal of the first controlled rectifier and a junction point between the resistor section and the capacitor section thereby to supply a control current to said control terminal of said first controlled rectifier from said junction point, and a diac connected between the junction point and a control terminal of the further controlled rectifier.

2. A circuit arrangement as claimed in claim 1, wherein the control terminal of the further controlled rectifier is connected via a resistor to the second power supply terminal.

3. A circuit arrangement as claimed in claim 2, wherein the controlled rectifiers comprise triacs.

4. A circuit arrangement as claimed in claim 1 wherein each of the controlled rectifiers comprises a triac.

5. A circuit for controlling an alternating current through a load having a first terminal connected to a first power supply terminal, said circuit comprising:

a series circuit including a resistor section and a capacitor section for connection between a second terminal of the load and a second power supply terminal, a first bidirectional controlled rectifier for connection between the second terminal of the load and the second power supply terminal, a single further bidirectional controlled rectifier connected between a control terminal of the first controlled rectifier and a junction point between the resistor section and the capacitor section thereby to provide a low resistance path via the further controlled rectifier to discharge the capacitor section in each half cycle of an AC supply voltage at said first and second power supply terminals, and a diac connected between said junction point and a control electrode of the further controlled rectifier to control turn-on of said further controlled rectifier independently of the diac voltage and nominal tolerances in the resistor section.

6. A circuit as claimed in claim 5, further comprising a resistor connected between the control electrode of the further controlled rectifier and the second power supply terminal.

* * * * *